United States Patent [19]

Crowe

[11] Patent Number: 5,092,777
[45] Date of Patent: Mar. 3, 1992

[54] ALPHABET TEACHING AND LEARNING GAME AND METHOD THEREOF

[76] Inventor: James E. Crowe, P.O. Box 541453, Merrit Island, Fla. 32954

[21] Appl. No.: 513,971

[22] Filed: Apr. 24, 1990

[51] Int. Cl.⁵ ............................................... G09B 1/00
[52] U.S. Cl. ..................................... 434/159; 434/129; 434/170
[58] Field of Search ............... 434/129, 159, 156, 161, 434/170; 273/302, 299

[56] References Cited

U.S. PATENT DOCUMENTS

| | | | |
|---|---|---|---|
| 1,076,307 | 10/1913 | Nicholson | 273/299 |
| 1,841,369 | 1/1932 | Freeman | 434/159 |
| 4,188,734 | 2/1980 | Rich | 434/159 |
| 4,950,165 | 8/1990 | Machaalani | 434/159 |

FOREIGN PATENT DOCUMENTS

| | | | |
|---|---|---|---|
| 375484 | 6/1932 | United Kingdom | 273/152 |
| 890170 | 11/1989 | World Int. Prop. O. | 273/299 |

Primary Examiner—Robert Bahr
Assistant Examiner—Karen A. Richard
Attorney, Agent, or Firm—Leonard Bloom

[57] ABSTRACT

A teaching and learning game for players to learn the sequence of letters in the alphabet. In a preferred embodiment, a set of blocks has a different letter of the alphabet marked on each side of a respective block and further has marked on two sides of the block, first indicia means to indicate the preceding letter, and has marked on two other sides of the block second indicia means to indicate the succeeding letters. Another preferred embodiment includes a set of twenty-six cards having the letters of the alphabet marked in alphabetical sequence on the sides of the cards. Further, one side of each card is marked with first indicia means to indicate the preceding letter and the other side of each card is marked with second indicia means to indicate the succeeding letter. Point scores are awarded to players correctly identifying the preceding or succeeding letter of the alphabet. Selected cards are further marked with scoring indicators to award bonus points to the players. Further the cards are marked with a number corresponding with the numerical sequence in alphabetical order of the letter of the alphabet marked on the respective side of the respective card. A third embodiment is a video game to display a letter of the alphabet, first indicia means to indicate a preceding letter and second indicia means to indicate a succeeding letter. Methods of playing the games are provided.

8 Claims, 6 Drawing Sheets

ALPHABET TEACHING AND LEARNING GAME AND METHOD THEREOF

FIELD OF THE INVENTION

The present invention relates to teaching and learning games for players to learn the sequence of letters in the alphabet.

BACKGROUND OF THE INVENTION

Many recent studies have highlighted the poor reading ability of a disturbingly high percentage of the population, both children and adults. Efforts are being made by government agencies and education groups to improve the reading and literacy of the general public. One of the fundamentals of reading is a thorough knowledge of the alphabet.

One approach to correcting this serious problem is to teach the alphabet by means of a game. Examples of alphabet blocks can be found in U.S. Pat. No. 21,798 issued to Hill and 1,477,255 issued to Fritz. Both of these disclose a block having five different letters of the alphabet and a numeral on the separate sides of the block. U.S. Pat. No. 3,811,206 issued to Gacetta discloses a board having raised numbers affixed to the upper surface and a set of twenty-six movable blocks marked to represent each letter of the alphabet. The blocks have an under surface which is recessed to mate with the number which corresponds to its sequence in the alphabet.

Playing cards have also been used in teaching the alphabet as disclosed in U.S. Pat. No. D 56,985 issued to Moore and No. 4,192,513 issued to Feeley et al. The former discloses a deck of cards, each card having a separate letter of the alphabet displayed in upper case and lower case and a drawing of an object, the name of which is spelled with the first letter thereof being the letter displayed on the specific card. The latter discloses a card game which has a three letter natural alphabetical sequence. The second letter of the sequence is also imprinted in the upper and lower corners of the diamond shaped playing card. The cards also indicate a suit (spades, clubs, hearts or diamonds) and there are 26 cards in each suit. The reverse side of the card has a pattern design and is not imprinted with letters of the alphabet.

Despite these devices being available for many years, they are not widely used and the education problem is still a major one. Furthermore, the cited references do not present a technique to facilitate learning the alphabet as an orderly sequence to determine the letters preceding and succeeding one another.

SUMMARY OF THE INVENTION

Accordingly, it is the primary object of the present invention to provide an entertaining and educational game which facilitates learning of the alphabet.

It is another object of the present invention to provide a game which encourages the players to learn the alphabet in such a manner that the player can identify the letter which precedes and the letter which succeeds any selected letter of the alphabet.

It is still another object of the present invention to provide a game of blocks with three letters of the alphabet marked on each block and further markings on each block for the players to use in identifying letters of the alphabet which precede and which succeed a selected letter on a specific block.

It is yet another object of the present invention to provide a set of cards, each having two sequential letters of the alphabet marked thereon, and further having indicia marked thereon for the card players to indicate the letter preceding and the letter succeeding the letter displayed on the card.

It is a further object of the invention to provide a set of cards, each having two sequential letters of the alphabet marked thereon, and further having a numeral on each card, the numeral corresponding with the numerical sequence in alphabetical order of the letters marked on the specific card.

It is still further object of the invention to provide a video game to display the letters of the alphabet with indicia means to indicate the preceding and succeeding letters of the alphabet.

It is a yet further object of the present invention to provide a method of playing an educational game to assist persons in learning the alphabet and the sequence of letters of the alphabet.

In accordance with the teachings of the present invention, there is disclosed a teaching and learning game of blocks to be used by at least one player to learn the alphabetical sequence of letters in the alphabet. A set of twelve blocks is provided, each having six sides. Each side has marked thereon a letter of the alphabet. Two of the six sides further have marked thereon first indicia means to indicate the preceding letter of the alphabet. A further two sides have marked thereon second indicia means to indicate the succeeding letter of the alphabet. In this manner, each block may indicate a sequence of two letters of the alphabet and each block may further indicate the letter of the alphabet which precedes said two letters and the letter of the alphabet which succeeds said two letters. Thus, each block has three letters of the alphabet marked thereon and the set of twelve blocks has twenty-five letters marked thereon. A thirteenth block has six sides, two sides are marked with the letter "A". One of said sides further has marked thereon second indicia means to indicate the succeeding letter of the alphabet. Two sides of the thirteenth block are marked with the letter "B" and one of said sides further has marked thereon first indicia means to indicate the preceding letter of the alphabet. One side has marked thereon first indicia means for preceding and one side has marked thereon second indicia means for succeeding. The at least one player may identify the letter of the alphabet preceding the letter marked on a respective side of a selected block and the at least one player may identify the letter of the alphabet which is marked on the respective side of the selected block.

In another preferred embodiment, a teaching and learning game of cards is disclosed to be used by at least two players to learn the alphabetical sequence of letters of the alphabet. The game includes a set of twenty-six cards, each card having a first side and a second side. The first side of each card has marked thereon a letter of the alphabet and further has marked thereon, second indicia means to indicate the succeeding letter of the alphabet. The second side of each card has marked thereon the letter of the alphabet next in sequence after the letter of the alphabet marked on the first side of said card. The second side of the card further has marked thereon first indicia means to indicate the preceding letter. The players are directed to identify the letter of the alphabet which succeeds the letter marked on the first side of said card and to identify the letter of the alphabet which precedes the letter marked on the second side of said card. Also provided is a set of instructions for the use of the cards, such that the players may compete to be the first player to properly identify the letter of the alphabet as directed by the selected card.

In still another preferred embodiment a teaching and learning game is provided to be used by at least one player to learn the alphabetical sequence of letters of the alphabet. The game includes a plurality of images including an image for each letter of the alphabet. First indicia means are provided to indicate the letter preceding a selected image of a letter of the alphabet. Second indicia means are provided to indicate the letter succeeding a selected image of a letter of the alphabet. Also provided are a video screen for displaying the image, reader means for the at least one player to read the selected image, means for the at least one player to identify the preceding image and the succeeding image of the selected image of the letter of the alphabet, and means for communicating the images to the video screen whereby the images are displayed in the sequence identified. The at least one player may identify the letter of the alphabet which is indicated by the indicia means and may be awarded points for correctly identifying the letter of the alphabet.

These and other objects of the present invention will become apparent from a reading of the following specification, taken in conjunction with the enclosed drawings.

DESCRIPTION OF THE PREFERRED EMBODIMENTS

The games of the present invention may be used by persons of any age from pre-school to adult to assist in teaching and the rapid learning of the alphabet and of the sequence of letters in the alphabet. In particular, the games facilitate learning the alphabet so that the player can recognize the letters preceding and succeeding the letter displayed in the game.

Referring now to the drawings, FIGS. 1-4 show typical blocks of the block game. There are thirteen blocks in the game which are approximately 1½ inches square but may be of any desired size. The blocks may be made of wood, plastic or any suitable material and may have rounded or square corners or edges. Each individual block 15 has six sides.

Figure 1:
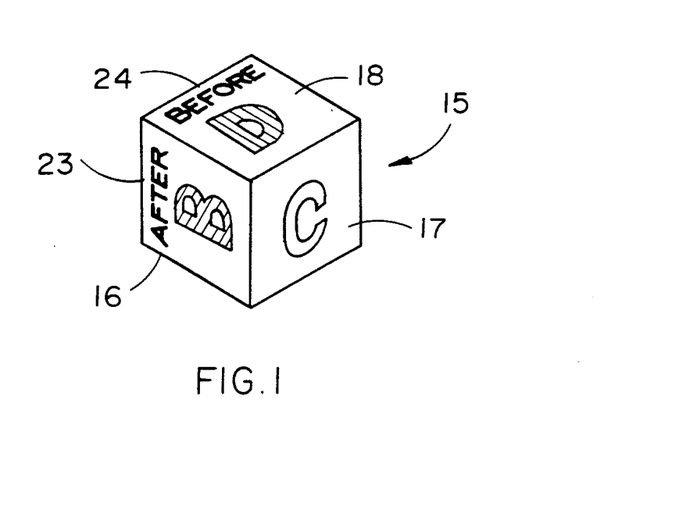
FIG. 1 is a perspective view of the one block of the block game of the present invention showing three sides of the block.
Figure 2:
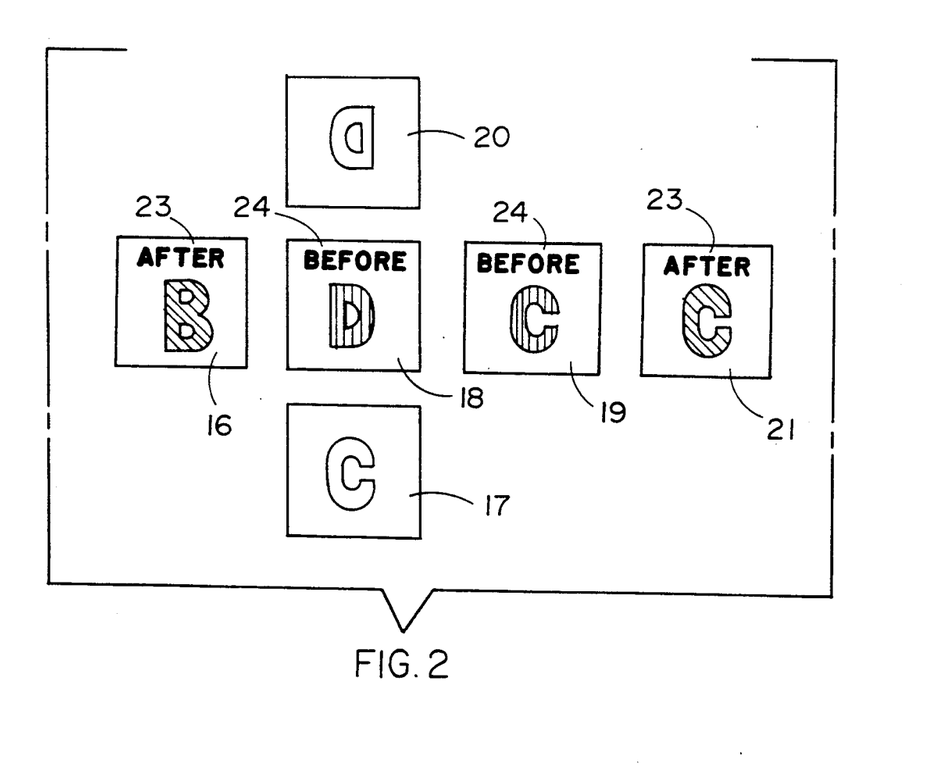
FIG. 2 is a laid out view of the block of FIG. 1 showing all the sides thereof.
Figure 3:
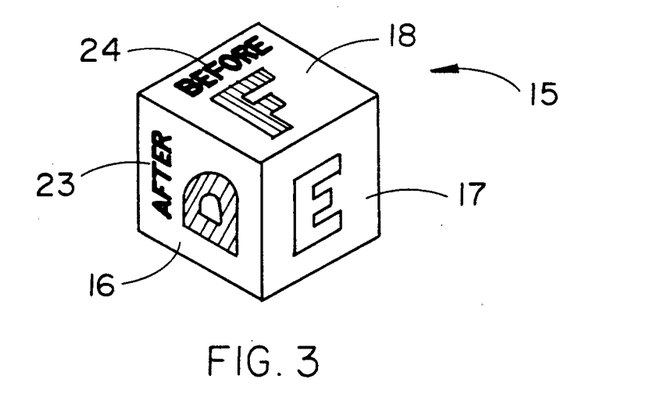
FIG. 3 is a perspective view of the block next succeeding the block of FIG. 1 showing three sides of the block.
Figure 4:
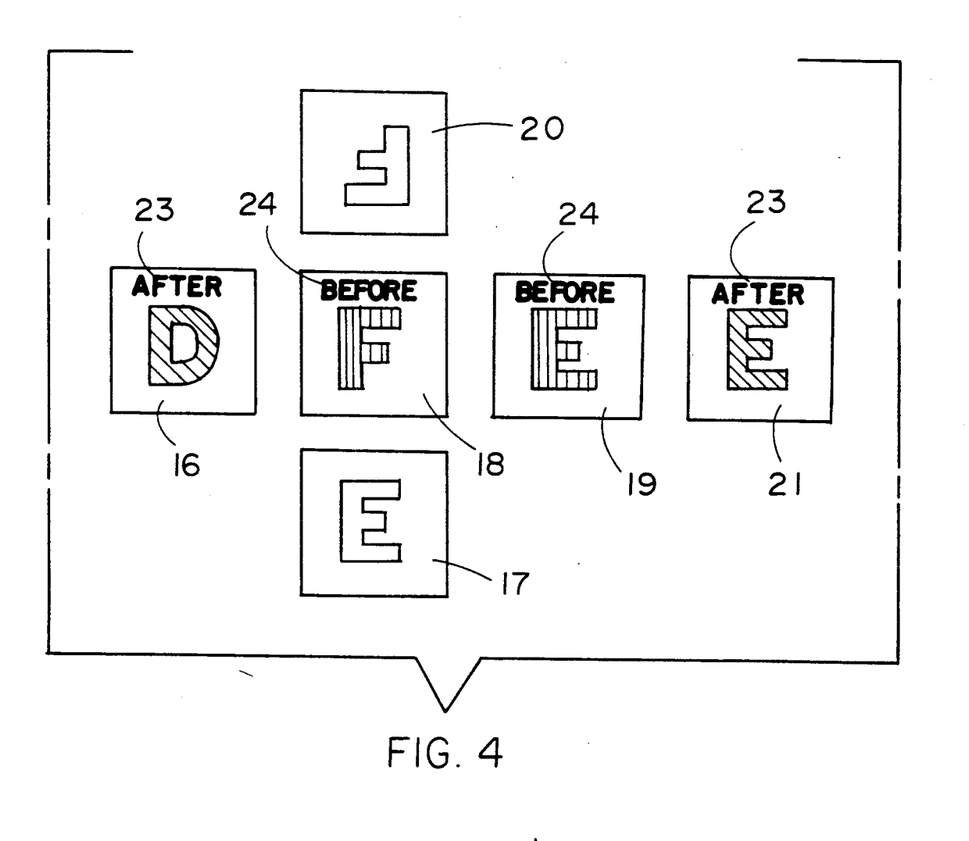
FIG. 4 is a laid out view of the block of FIG. 3 showing all of the sides thereof.

On twelve of the blocks 15, the letters of the alphabet are marked as the respective sides by paint, decals, molding or any desired method the letters being planar, raised or depressed as desired. The sequence of marking is as shown. A first side 16 has a letter of the alphabet marked thereon. Also marked on the first side 16 of the block 15, there is a second indicia means 23 to indicate the succeeding letter to the letter of the alphabet marked on the first side 16. As shown in FIGS. 1-4, this may be the notation "AFTER". Other indicia means 23 such as color coding may be used, as for example, for persons who are unable to read the written notation. A single indicia means or multiple indicia means may be used as desired. FIGS. 1 and 2 show the color code (for example, green for "succeeding" and red for "preceding") applied to the letters on the sides of the block 15, but the color may be applied to the entire side, part of the side or in any manner desired. On the fourth side 19 of the block 15, which is opposite to the first side 16, there is marked the letter of the alphabet which immediately or next succeeds the letter marked on the first side 16 of the same block 15. Thus, as shown in FIG. 2, the letter "B" is marked on the first side 16 and the letter "C" is marked on the fourth side 19. Similarly, in FIG. 4, the letter "D" is marked on the first side 16 and the letter "E" is marked on the opposite, fourth side 19. Further, the fourth side 19 also has marked thereon first indicia means 24 to indicate the preceding letter. Thus, FIGS. 2 and 4 show the notation "BEFORE" on the fourth side 19. Also, in FIG. 2, the letter "B" on the first side 16 is shown to be color coded green as the second indicia means 23 and the letter "C" on the fourth side 19 is shown to be color coded red as the first indicia means 24. The second side 17 of the block 15 has marked thereon the letter of the alphabet which succeeds the letter of the alphabet marked on the first side 16. Accordingly, the second side 17 in FIGS. 1 and 2 is marked with a "C" and the second side 17 in FIGS. 3 and 4 is marked with an "E". The fifth side 20 of each block 15, opposite from the second side 17, has marked thereon the letter of the alphabet next succeeding the letter marked on the second side 17. Thus, FIG. 2 shows the letter "D" on the fifth side 20 and FIG. 4 shows the letter "E" on the fifth side 20. The third side 18 has marked thereon the same letter as is marked on the fourth side 19. Thus, FIGS. 1 and 2 show the letters "D" on the third side 18 and FIGS. 3 and 4 show the letter "F" on the third side 18. Further, the third side 18 also has marked thereon first indicia means 24 to indicate the preceding letter. The third side 18 has the notation "BEFORE" and in FIGS. 1 and 2, the letter "D" is shown in red as the first indicia means 24. A sixth side 21, opposite to the side 18, has marked thereon the same letter of the alphabet as is marked on the second side 17. Thus, FIGS. 2 and 4 show the letters "C" and "E" respectively on the sixth side 21 thereof. Further, the sixth side 21 of each block 15 has marked thereon second indicia means 23 indicating the succeeding letter. As shown in FIGS. 2 and 4, the notation "AFTER" is marked on the sixth side 21 and the letter "C" on the sixth side 21 of FIG. 2 is color coded green. The markings on the separate blocks 15 are alphabetically sequential such that the letters on the second side 17 and the third side 18 of separate blocks 15 designate the letters of the alphabet from "B" through "Z". As is shown in FIGS. 2 and 4, the letters respectively are "C", "D" and "E", "F". Similarly, other blocks in the set have marked on their respective second side and third side the letters "G", "H" and "I", "J" and continuing. In this manner, each block has marked thereon three different letters of the alphabet and the twelve blocks have marked thereon the twenty-five letters from "B" through "Z".

Figure 5:
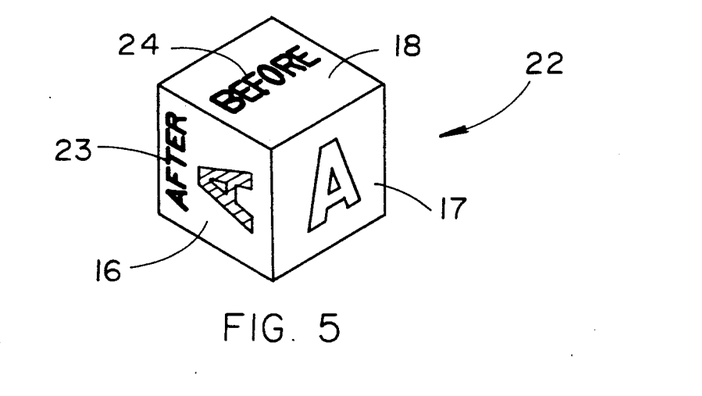
FIG. 5 is a perspective view of the first block of the set of the block game of the present invention showing three sides of the block.
Figure 6:
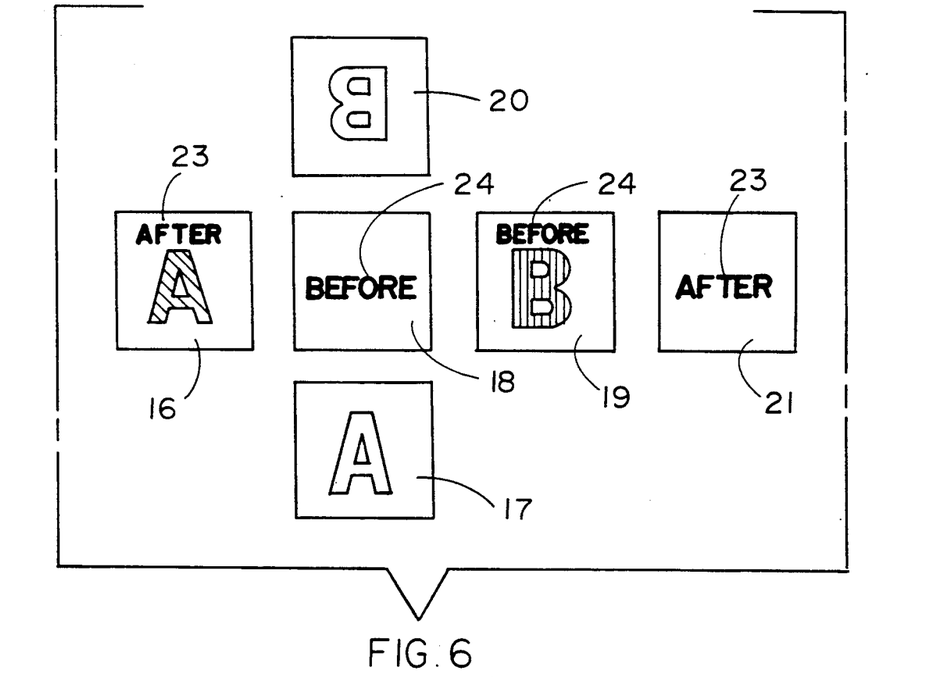
FIG. 6 is a laid out view of the block of FIG. 6 showing all the sides thereof.
Figure 7:
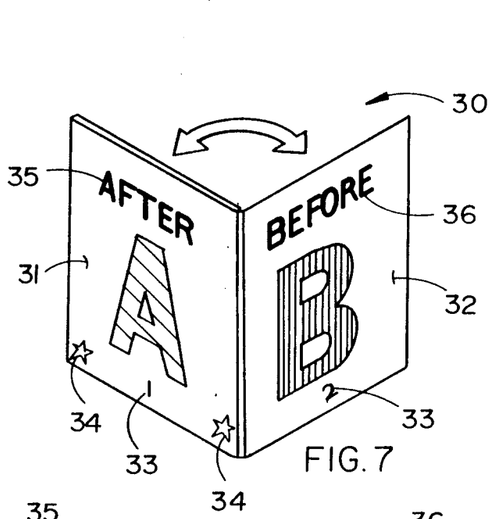
FIG. 7 is a perspective view of the card of the game of the present invention on which are marked the initial letters of the alphabet showing the opposite sides of the same card.
Figures 8, 9, 10:
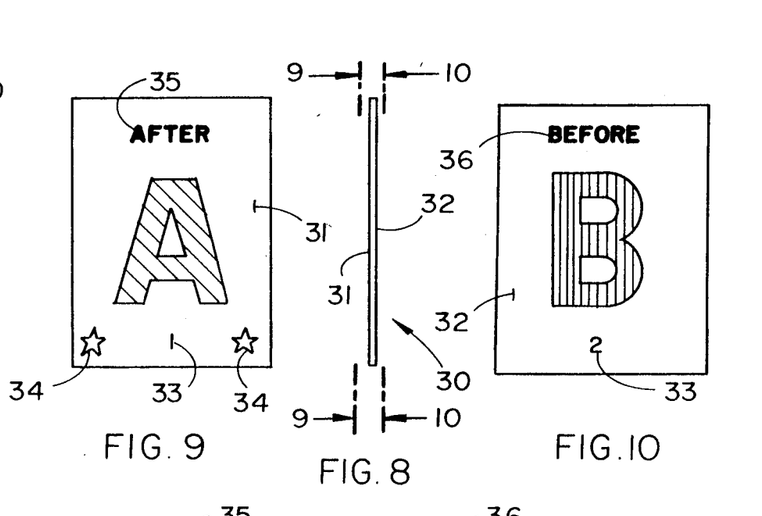
FIG. 8 is an end view of the card of FIG. 7.
FIG. 9 is a plan view of the card of FIG. 8 taken along the lines 9—9 to show one side of the card.
FIG. 10 is a plan view of the card of FIG. 8 taken along the lines 10—10 to show the opposite side of the card.

Referring to FIGS. 5 and 6, the thirteenth block 22 has marked on the first side 16, the letter "A" and further has marked on the first side second indicia means 23 to indicate the succeeding letter. The notation "AFTER" and the letter color coded green are shown in FIG. 5. The fourth side 19, opposite to the first side 16, has marked thereon the letter "B" and further has marked thereon first indicia means 24 to indicate the preceding letter. FIG. 6 shows the notation "AFTER" on the fourth side 19. The second side 17 has marked thereon the letter "A". The fifth side 20, opposite to the second side 17, has marked thereon the letter "B". The third side 18 has marked thereon the first indicia means 24 to indicate preceding and is marked "BEFORE". The sixth side 21, opposite to the third side 18 has marked thereon the second indicia means 23 to indicate succeeding and is marked "BEFORE".

The game may be played by one to eight persons. Two sets of blocks are recommended for more than four players. The game is played by placing the blocks 15 on a flat surface such as a table with the side of the block 15 having an indicia means 23, 24 facing upwardly. One player, who is selected to initiate the game, indicates one of the blocks. The player to first identity the preceding or succeeding letter of the alphabet (as required by the indicia means on the selected block) is assigned on point. The block 15 which had been selected is now rotated such that a different side of said block 15 having an indicia means is facing upwardly. Another block is identified and the above is repeated until one player accumulates a predetermined number of points, such as 26 points. The first player to accumulate these points becomes the winner.

Figures 11A, 11B:
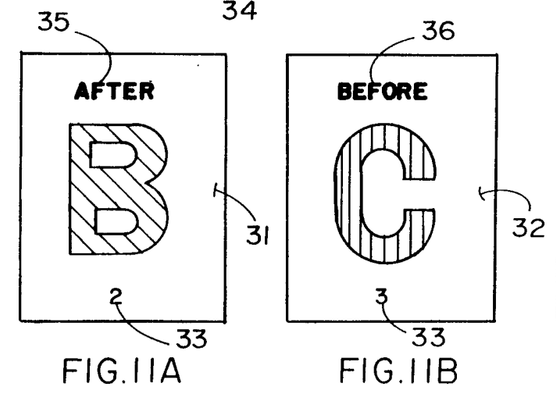
FIG. 11A is a plan view of a card of the game next succeeding the card of FIG. 7.
FIG. 11B is a plan view of the opposite side of the card of FIG. 11A on which is marked the succeeding letter of the alphabet.
Figure 12A:
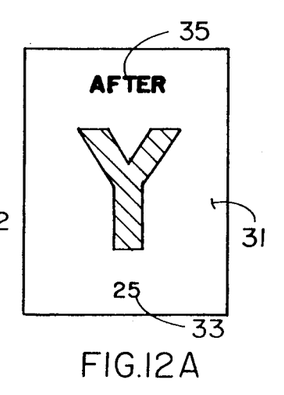
FIG. 12A is a plan view of one side card of the game on which are marked the next to the last letter of the alphabet.
Figure 12B:
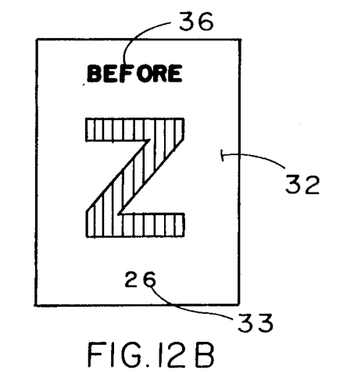
FIG. 12B is a plan view of the opposite side of the card of FIG. 12A on which is marked the last letter of the alphabet.

In another preferred embodiment, the game is a card game to be used by at least two players and as many as four players. A set (or deck) of twenty-six cards 30 are provided. The cards 30 may be of any convenient size such as three inches by five inches and may be made of any desired material. Conventional playing card material or plastic may be used. As shown in FIGS. 7-12B, the cards 30 have a first side 31 and a second side 32. The first side 30 of each card has marked thereon a letter of the alphabet and further has marked thereon a second indicia means 35 to indicate the succeeding letter of the alphabet. The second side 32 of each card has marked thereon the letter of the alphabet next in sequence after (succeeding) the letter of the alphabet marked on the first side 31 of said card 30. The second side 32 of each card further has marked thereon, first indicia means 36 to indicate the preceding letter of the alphabet. Thus, in FIGS. 7-10, the first side 31 has the letter "A" marked thereon and the second side 32 has the letter "B" marked thereon. In a similar manner, and as shown in FIG. 11A-11B, another card 30 has marked on the first side 31, the letter "B" and second indicia means 35 to indicate the succeeding letter of the alphabet ("AFTER"). The second side 32 has marked thereon the letter "C" and first indicia means 36 to indicate the preceding letter of the alphabet ("BEFORE"). FIG. 12A and 12B shows the card 30 which has marked thereon the letters "Y" and "Z" in a similar manner on the respective first side 31 and the second side 32. Further, each side of each card 30 has marked thereon a number 33, the number 33 corresponding with the numerical sequence in alphabetical order of the letter of the alphabet which is marked on the respective side of the respective card. Thus, as shown in FIGS. 7-11B, the side of the card 31 marked "A" has the corresponding number "1", the side of the card 32 marked "B" has the corresponding number "2", the side of the card 32 marked with the letter "C" has the corresponding number "3". FIG. 12A and 12B shows the letter "Y" with number "25" and the letter "Z" with the number "26". The indicia means 35, 36 may also be color coded as was described for the block game embodiment of the present invention. FIGS. 7, 11A, 11B and 12A-12B show the color red to represent the preceding first indicia means 36 and the color green to represent the succeeding second indicia 35 although any desired color code may be used. The cards 30 further have marked on selected cards, scoring indicia means 34 such as the star design shown in FIGS. 7 and 9. Other distinctive indicia means 34 may be used as desired. These scoring indicia means 35 provide bonus scoring points to the player who correctly identifies the succeeding or preceding letter as required.

Figure 13:
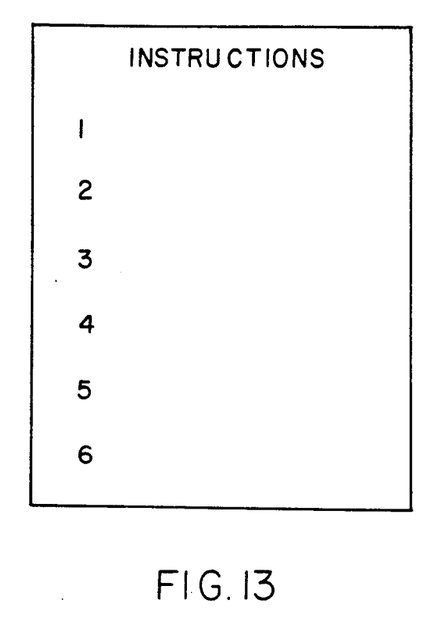
FIG. 13 is a plan view showing a card having the instructions of the card game printed thereon.

The game further has a set of instructions 37 which may be printed on a card 30 as shown in FIG. 13 or may be printed on a separate page or booklet as desired.

The card game is played by having one player displaying each card, one at a time and in sequence or randomly, to all of the players. The player who is the first to correctly identify the before or after letter (as required by indicia means on the the displayed card), is awarded points. The displayed card is then placed in a discard stack. A suggested point system is based on one point for a consonant, two points for a vowel. The vowels, as denoted by the scoring indicia means 34, have two stars or similar distinctive marks. Further, if the player correctly identifies the preceding or succeeding letter's numerical position in the alphabet, an additional bonus point is awarded. The player having accumulated the greatest number of points after all the cards have been displayed is determined to be the winner. Of course, variations in the order of display of the cards and scoring procedures may be made.

Figure 14:
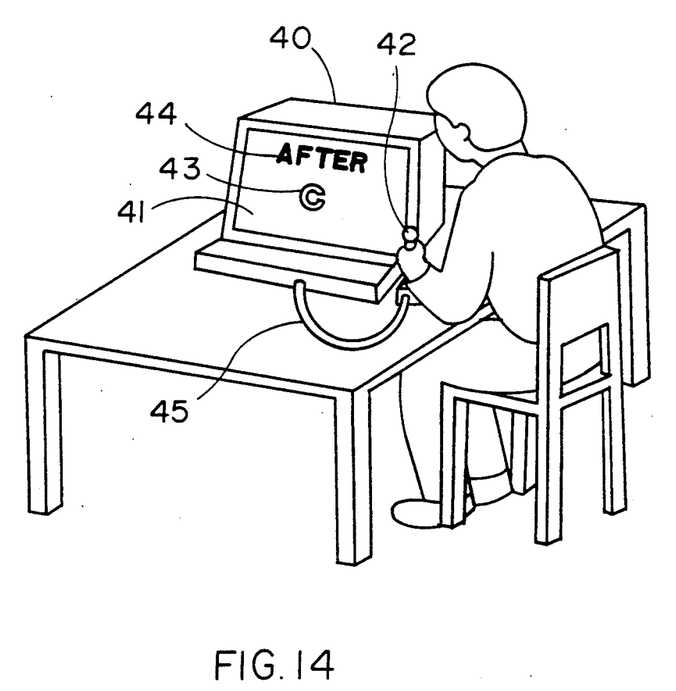
FIG. 14 is a perspective view showing a video game having an image of a letter of the alphabet with an indicia means displayed thereon.

In still another preferred embodiment, as shown in FIG. 14, the game is a video game 40 to be used by at least one player. A video screen 41 is provided on which there may be displayed a plurality of images. The images include a separate image 43 for each letter of the alphabet. A reader means 42, connected to the video screen 41 by a communicating means 45, enables the player to select an image 43 to be displayed on the screen. Also displayed on the video screen 41 is an indicia means 44 to indicate the preceding letter of the alphabet and the succeeding letter of the alphabet of the image 43 displayed. The indicia means 44 may be either for the preceding or the succeeding letter. The player identifies the letter as indicated by the indicia means 44, either preceding or succeeding. The indicia means 44 may be the notation "before" or "after" or may be a color code or other means as desired. If the identification is correct, the player is awarded a point score. The accumulation of point scores is used to determine a winning player.

The game is played by the player, using the reader means 42, selecting an image 43 of a letter of the alphabet and selecting an indicia means 44 which are displayed on the video screen 41. The player, upon seeing the display, identifies the succeeding or preceding letter of the alphabet as indicated by the indicia means 44 displayed on the video screen 41. Points are awarded to the player for a correct identification. Also, if desired, additional points may be awarded for selected letters of the alphabet as indicated by scoring indicia means which are displayed on the video screen 41. A further display is a number which corresponds to the numerical sequence in alphabetical order of the letter which is displayed on the video screen 41. Additional players may play using the above procedure. The player with the largest accumulated point score is the winner of the game.

By use of the above embodiments of the present invention, persons may become more familiar with the letters of the alphabet and the sequence of the letters. The players of the game are assisted in learning the preceding and succeeding letters of any selected letter. Further, the players may associate a specific letter with its numerical position in the sequence of letters. The learning procedure is accomplished in the format of an entertaining game.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. A teaching and learning game of cards to be used by at least two players to learn the alphabetical sequence of letters of the alphabet comprising:
   a set of twenty-six cards, each card having a first side and a second side, the first side of each card having marked thereon a letter of the alphabet and further having marked thereon second indicia means to indicate (the succeeding letter), the second side of each card having marked thereon the letter of the alphabet next in sequence after the letter of the alphabet marked on the first side of said card, the second side of the card further having marked thereon first indicia means to indicate the preceding letter such that the players are directed to identify the letter of the alphabet which succeeds the letter marked on the first side of said card and to identify the letter of the alphabet which precedes the letter marked on the second side of said card;
   a set of instructions for the use of the cards;
   such that the players may compete to be the first player to properly identify the letter of the alphabet as directed by indicia means marked on the selected card.

2. The game of cards of claim 1, further comprising each side of each card having marked thereon a number, each number corresponding with the numerical sequence in alphabetical order of the letter of the alphabet marked on the respective side of the respective card.

3. The game of claim 1, wherein the first indicia means for the preceding letter is the notation "before" and the second indicia means for the succeeding letter is the notation "after".

4. The game of claim 1, wherein the first indicia means for the preceding letter is a first color and the second indicia means for the succeeding letter is a second color.

5. The game of cards of claim 1, wherein point values are assigned to each card and the players are awarded points when the players properly identify the alphabetical letter before and after a selected card.

6. The game of cards of claim 1, further having marked thereon adjacent to selected letters, scoring indicators to provide points to the player correctly identifying the preceding and succeeding letters of the letter having said scoring indicator adjacent thereto.

7. A teaching and learning game to be used by at least one player to learn the alphabetical sequence of letters of the alphabet comprising:
   means for displaying a selected letter of the alphabet;
   means for displaying a first indicia means to indicate to the at least one player to identify the letter of the alphabet preceding said selected letter of the alphabet, said first indicia means being displayed simultaneously with said selected letter of the alphabet;
   means for displaying the letter of the alphabet preceding the selected letter, said means further being for displaying a second indicia means to indicate to the at least one player to identify the letter of the alphabet succeeding said letter of the alphabet, said second indicia means being displayed simultaneously with the letter preceding the selected letter of the alphabet and exclusively of the first indicia means;
   such that the at least one player may identify the letter of the alphabet as indicated by the indicia means displayed and points may be awarded to the at least one player for correctly identifying the letter of the alphabet indicated by the indicia means for the at least one player to identify.

8. The game of claim 6, further comprising a plurality of cards, wherein each card has marked thereon a single letter of the alphabet and the corresponding indicia means.

* * * * *

UNITED STATES PATENT AND TRADEMARK OFFICE
CERTIFICATE OF CORRECTION

PATENT NO. : 5,092,777
DATED : March 3, 1991
INVENTOR(S) : Crowe

Figure 2A:
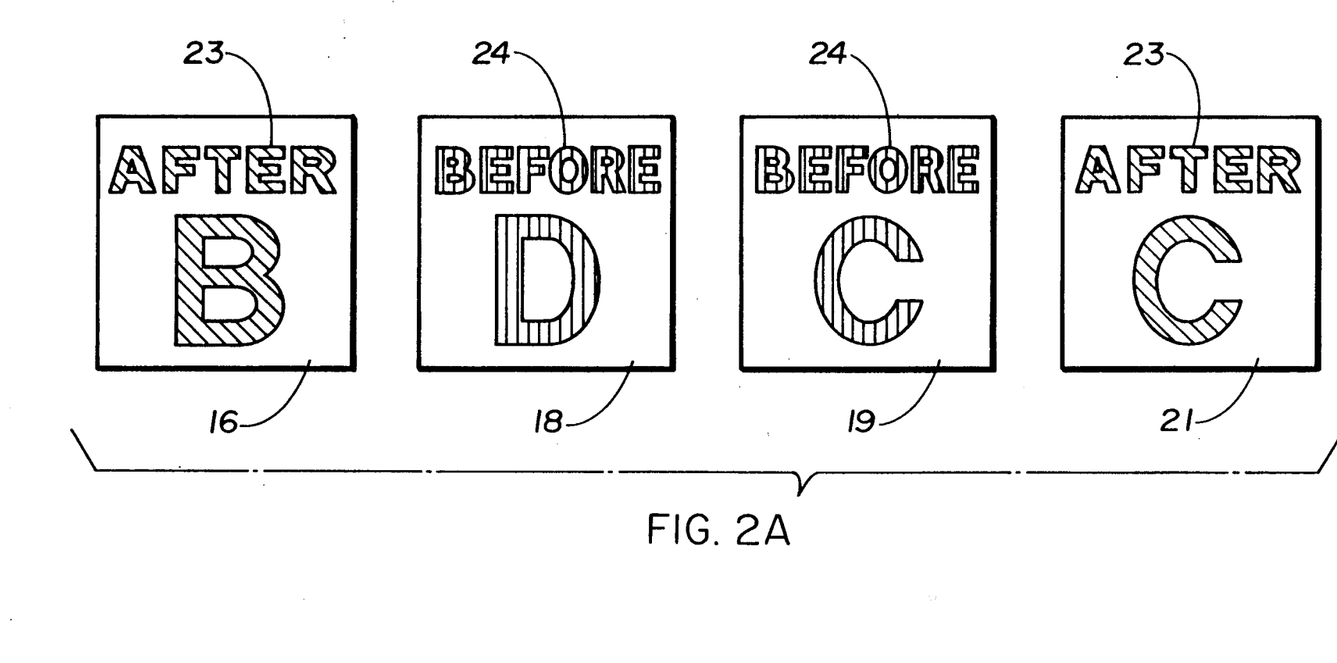

It is certified that error appears in the above-indentified patent and that said Letters Patent is hereby corrected as shown below:

On the title page,

In the Abstract, line 7, change "letters" to -- letter -- ;

In column 5, line 35, change "AFTER" to -- BEFORE --;

In column 5, line 43, change "BEFORE" to -- AFTER -- ;

In column 6, line 7, delete the comma "," after "thereon";

In column 6, line 34 before "FIGS." insert -- In a similar manner to FIG. 2A, the -- ;

In column 7, line 57, delete the parenthesis around words "(the succeeding letter)".

Signed and Sealed this

Twenty-third Day of November, 1993

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,092,777
DATED : March 3, 1992
INVENTOR(S) : Crowe

It is certified that error appears in the above-indentified patent and that said Letters Patent is hereby corrected as shown below:

In column 3, after line 37 and before line 38, insert therein -- FIG. 2A is an enlarged view of a portion of the block of FIG. 2 showing the indica marked to indicate color coding -- ;

In column 4, line 36, change "1 and 2" to -- 1, 2 and 2A -- ;

In column 4, line 52, change "FIG. 2" to -- FIGS. 2 and 2A. -- ;

In column 5, line 5, change "1 and 2" to -- 1, 2 and 2A -- ;

In column 5, line 32 after "5" and before the period, insert therein -- in a manner similar to FIG. 2A -- ;

In column 6, line 35, change "show the color" to -- also are color coded -- ;

In column 7, line 13 after "code" and before "or", insert therein -- (as in FIG. 2A) -- .

Signed and Sealed this

Sixteenth Day of August, 1994

Attest:

BRUCE LEHMAN

*Attesting Officer*     *Commissioner of Patents and Trademarks*